Figure 1:
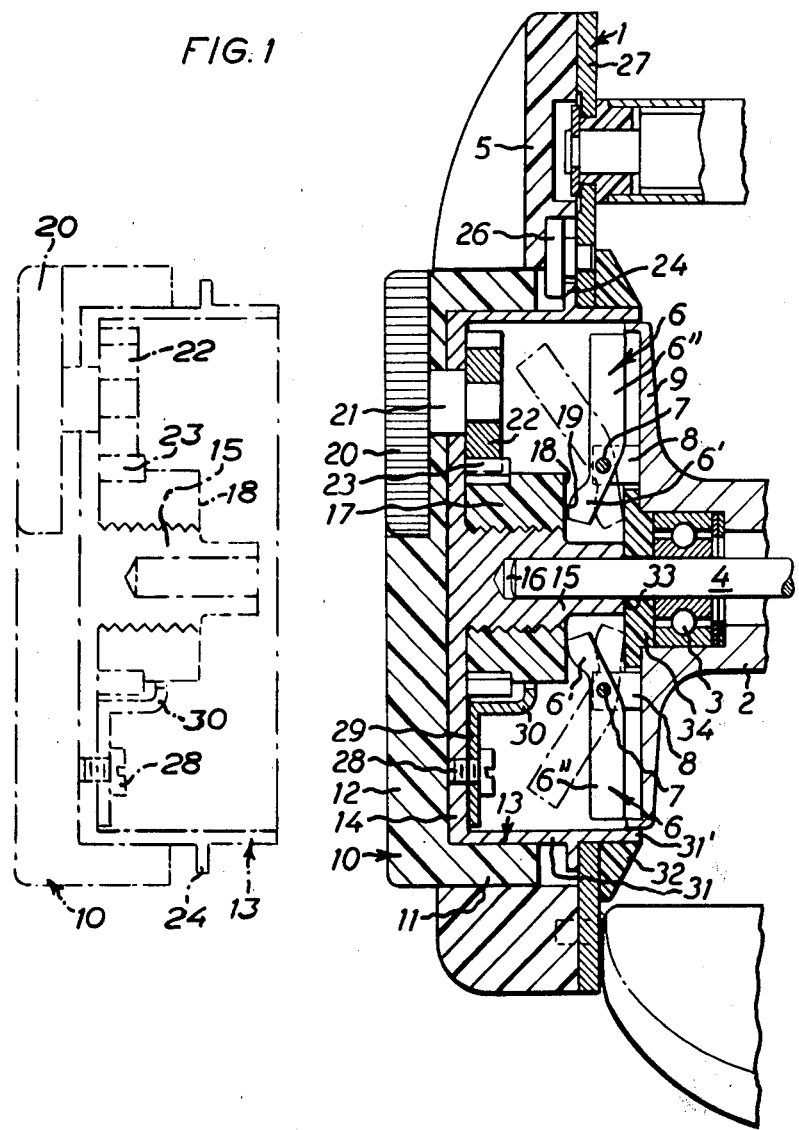

United States Patent [19]

Karlsson et al.

[11] 4,390,140
[45] Jun. 28, 1983

[54] CENTRIFUGAL BRAKE FOR FISHING REELS

[75] Inventors: Jarding U. Karlsson, Svängsta; Börje S. Moosberg, Mörrum, both of Sweden

[73] Assignee: ABU Aktiebolag, Sweden

[21] Appl. No.: 242,766

[22] Filed: Mar. 11, 1981

[30] Foreign Application Priority Data

Mar. 18, 1980 [SE] Sweden .............................. 8002091

[51] Int. Cl.³ .......................................... A01K 89/02
[52] U.S. Cl. .............................. 242/84.52 C; 188/185
[58] Field of Search ................. 242/84.52 C; 188/184, 188/185

[56] References Cited

U.S. PATENT DOCUMENTS

| | | | |
|---|---|---|---|
| 1,347,529 | 7/1920 | Wherry | 242/84.52 C |
| 2,290,662 | 7/1942 | Willison | 242/84.52 C |
| 2,482,863 | 9/1949 | Nelson | 242/84.52 C |
| 2,967,676 | 1/1961 | Klingberg | 242/84.52 C |

FOREIGN PATENT DOCUMENTS

| | | | |
|---|---|---|---|
| 137333 | 9/1952 | Sweden | 242/84.52 C |
| 145570 | 6/1954 | Sweden | 242/84.52 C |
| 5531 | of 1914 | United Kingdom | 242/84.52 C |

Primary Examiner—Billy S. Taylor
Attorney, Agent, or Firm—Karl W. Flocks; A. Fred Starobin

[57] ABSTRACT

The disclosure relates to a centrifugal brake for the line spool in a fishing reel, the characterizing feature of the invention being that the line spool carries at least two brake weights pivotally mounted on the spool, the brake weights being pivotal in axial planes which are parallel to the shaft of the line spool, and that the frame of the reel carries an axially adjustable but otherwise stationary brake surface for braking cooperation with the brake weights.

3 Claims, 2 Drawing Figures

CENTRIFUGAL BRAKE FOR FISHING REELS

The present invention relates in general to fishing reels whose line spool rotates during the cast, and more particularly to a centrifugal brake for the line spool.

It is a common practice to equip the line spool of a fishing reel, of the type in which the line spool rotates during a cast, with a centrifugal brake whose purpose is to prevent, or in any event to reduce, the risk that the line spool, during a cast, rotate more rapidly than the pay-out rate of the line, which, as the skilled reader will be aware, normally results in a certain length of line being wound up in the reverse direction on the spool, with a bird's-nest, or backlash, as the result and an abrupt stop to the cast.

Conventional centrifugal brakes consist of brake weights which are carried on the line spool, in general only at one end of the line spool, and are shiftable, as a result of the centrifugal forces on rotation of the line spool, in a radial outward direction for braking against a circular, and normally cylindrical surface carried on the frame of the fishing reel. In a normal construction, the brake weights are guided on radial guide fingers or pins, but it is also known in the art to guide the brake weights in radial guide grooves.

The most superior of these prior art centrifugal brakes displays, granted, irreproachable function under given conditions, but also possesses disadvantages. One disadvantage is that the dimensions and weight of the brake weights, and thereby also their braking effect, are restricted because of the limited space between one end of the line spool and adjacent parts of the fishing reel, and that the brake weights, despite limited radial space, must have radial play between non-braking and braking position. It is also a very great disadvantage that the braking effect cannot be regulated but is determined by the centrifugal force which is dependent upon the speed of the line spool, and upon the weight of the brake weights, which is constant.

The primary object of the present invention is to obviate these disadvantages and, in particular, to realize a simple, functionally reliable centrifugal brake device whose braking effect may be adjusted. Moreover, a further object of the present invention is to realize a centrifugal brake device of the above-described type which is particularly easily accessible for adjustment or service.

To this end, the centrifugal brake device according to the present invention is characterized in that the brake weights are in the form of double-armed levers and are pivotally mounted in axial planes about pivot shafts which are located a distance from, and are at least substantially at right angles with respect to the axis of rotation of the line spool, and that the braking surface is axially adjustable in relation to the line spool and the brake weights by means of an adjustment apparatus for setting the braking effect on the centrifugal brake.

The nature of the present invention will be more readily understood from the following brief description of the accompanying drawings, and discussion relating thereto.

Figure 2:
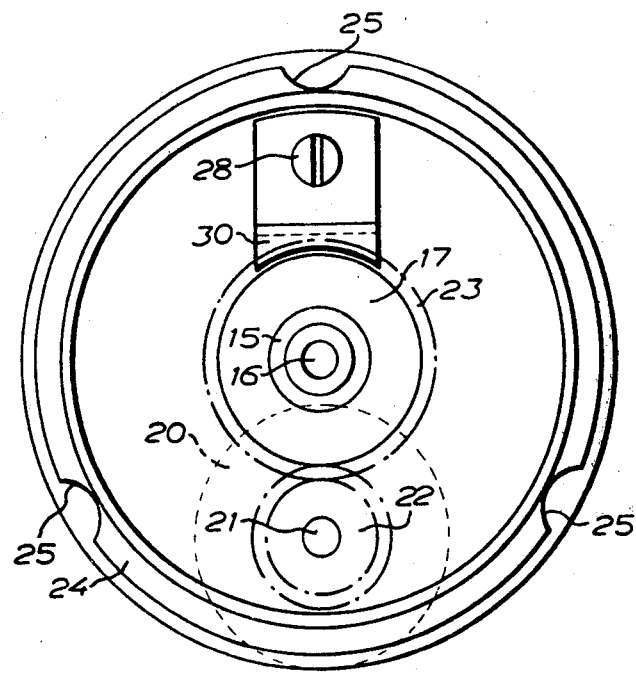

In the accompanying drawings:

FIG. 1 shows, in axial section, a portion of a fishing reel with a preferred embodiment of a centrifugal weight according to the present invention in an easily mountable and dismountable housing which is shown in phantom lines in a position dismounted from the fishing reel; and FIG. 2 is a plan view of the housing dismounted from the fishing reel and provided with parts of the centrifugal brake device mounted in the housing seen towards the bottom of the housing.

The fishing reel fragmentarily illustrated in FIG. 1 comprises a frame 1 and a line spool 2 which may be rotated by means of the crank and a transmission (not shown). The line spool is rotatably journalled by means of ball bearings 3 on a shaft 4 in the frame, the shaft possibly being adjustable for setting the line spool 2 in relation to the frame end walls, such as the left-hand frame end wall 5 shown in FIG. 1.

In the illustrated embodiment, the centrifugal brake device according to the invention includes two brake arms 6 pivotally mounted on the line spool.

Each brake arm 6 is pivotally disposed on a shaft 7 in a space between two supporting lugs 8 on the outer side of one end wall 9 of the line spool 2. Both of the shafts 7 extend at right angles with respect to the shaft of the line spool and support the two brake arms 6 in diametric positions (symmetric distribution).

The end portions 6' of the two brake arms located radially inside the pivot shafts 7 are, in the illustrated embodiment, angled axially outwardly in a direction from the line spool 2 and are actuable for adjustment of the brake arms 6 by means of the adjustment apparatus described below.

The adjustment apparatus for the brake arms is supported in a housing mounted in an opening in the frame end wall 5, the housing being in the form of a cup-shaped, knob-like lid or capsule 10 consisting of a cylindrical wall 11 and an outer wall 12 which forms the bottom of the cup.

In the illustrated embodiment, the cup-shaped lid 10 is of plastic, and a cup-shaped insert 13 is fixed on the inner side of the plastic lid as a lining, this insert preferably consisting of metal. The bottom wall 14 of the cup-shaped insert 13 supports an axially directed, exteriorly threaded pin 15 which, in a bore 16, accomodates an end portion of the shaft 4 of the spool, and on whose outer side a ring 17 is mounted having a friction surface 18 for cooperation with adjacent surfaces 19 of the radially inner end portions 6' of the two brake arms 6.

On rotation of the line spool 2, each brake arm 6 strives to assume a position in which the resultant of the gravitational force of both arms 6', 6" coincides with a radius. If it is assumed that the brake arm 6 is straight, that the angling of the arm portion 6' is slight, or that the arm portion 6' is short and light in relation to the arm portion 6", the brake arm 6 will, when the line spool 2 attains sufficient speed of rotation, be caused to assume a radial position. However, even if these conditions are not fully satisfied and the brake arm 6 is, for practical reasons, instead of the configuration shown, for example, in FIG. 1, centrifugal forces on rotation of the line spool will impart to the brake arms a tendency to be pivoted to a position of equilibrium in a direction towards the position shown by solid lines in FIG. 1. Moreover, if the friction surfaces 19 of the brake arms arrive, just prior to this event, at abutment against the friction surface 18 of the brake ring 17, the centrifugal brake will exercise a braking effect against rotation of the line spool. Apart from being dependent on the centrifugal forces and, in other words, on the rotation of the line spool 2, and the pivoting mass of the brake arms 6, the braking effect is also dependent upon the axial position of the friction surface 18. By adjustment of the brake ring 17 designed as a nut on the threaded pin 15, the braking force can, consequently, be adjusted.

The two positions in which the brake arms 6 are shown in FIG. 1 by means of solid lines and phantom lines, respectively, represent two extreme positions. The brake arms 6 are shown by solid lines in abutment with their friction surfaces 19 against the friction surface 18 of the brake ring 17, but if the friction surfaces 19 in this position only just abut against the friction surface 18, the braking force will be slight or non-existent. If, on the other hand, the friction surface 18 of the brake ring is in such an axial position that the friction surfaces 19 of the brake arms come, on rotation of the line spool, into abutment against the friction surface 18 at any angular position between the positions shown by means of solid lines and phantom lines, they will exercise a braking force which is int. al. dependent upon the angular positions of the brake arms in the actual braking phase. By axial adjustment of the brake ring 17, the braking effect of the centrifugal brake may be regulated between zero and a maximum level, and such an axial adjustment may be carried out by means of an apparatus which, in the illustrated embodiment, consists of a knob 20 mounted in a recess in the outer side of the lid wall 12, the knob being carried on the outer end of a knob shaft 21 which extends through and is journaled in the lid walls 12 and 14, and further of a gear set which is located in the cavity of the cup-shaped lid 10 and comprises a gear wheel 22 mounted on the inner end of the knob shaft 21, and a gear rim 23 carried on the brake ring 17 and in engagement with the gear wheel 22.

It is possible, by means of the knob 20 and by the intermediary of the gear set 22, 23, readily to adjust the brake ring for the desired braking effect.

A plate 29 can be secured to the inside of the lid 10 by means of, for example, a screw 28, and be provided with an arrest abutment 30 for cooperation with the end of the gear rim 23 in an inner end position for the brake ring 17, in which position the gear wheel 22 retains its engagement with the gear rim 23. This inner end position of the brake ring 17 represents a position for maximum braking effect if, in this position which corresponds to the position of the arms 6 shown by phantom lines, the radially inner, relatively short arm portions 6' have their points of gravity located on radii which coincide with the longitudinal axes of the short arm portions 6', since a pivoting moment realized by centrifugal force would, in such an instance, only act on each respective outer arm portion 6" and not be counteracted by a pivoting moment in the opposite direction of the corresponding inner arm portion 6'.

In the device according to the invention, the adjustment knob 20 for the centrifugal brake may be provided with calibration, and the outer side of the lid wall 12 may be provided with markings, or vice versa, for reading-off the setting of the centrifugal brake.

Both of the brake arms 6 pivotally mounted on the line spool 2 may be detachably or fixedly connected to the line spool. If they are detachably connected to the line spool they may be replaced, but irrespective of whether they are detachably or fixedly connected to the line spool, there is no risk of losing the brake arms when the fishing reel is dismantled, or during service work. Consequently, the device according to the invention satisfies the desire that the brake members cannot be lost, which has long been a sought-for situation in the art, and which in conventional centrifugal brakes for fishing reels can normally only be satisfied at the cost of a reduction of the mass of the centrifugal weights.

As has been shown and described above, the entire adjustment apparatus and the entire brake device (apart from the brake arms 6 serving as centrifugal weights) are carried on the lid 10 and form, together with the lid 10, a combined unit which may easily be dismounted and mounted in place.

For rapid connection of the lid 10 to the frame end wall 5, the lid is provided with a radial flange 24 with one or more recesses 25, and the frame end wall 5 is, in the region of the opening for the lid 10, provided with suitable bosses 26 which may pass through the recesses 25, so that the lid may thereafter be locked with respect to the bosses 26 by being rotated a minor fraction of a revolution.

The bosses 26 may consist of the heads of pins or screws which are connected to a plate 27 mounted on the inside of the frame end wall 5.

In the illustrated embodiment of the cup-shaped lid 10, the axial inner end portion 31' of the cylindrical wall 31 of the cup-shaped lining 13 extends axially inwardly from the cylindrical outer wall 11 of the lid, past the inside of the plate or the inner frame end wall 27 and is surrounded by a sealing ring 32 which is secured to the inside of the frame end wall plate 27. In this position, the lid 10 rests with the flange 24 against the outer side of the frame end wall plate 27.

The pin 15 which is coaxial with the shaft 4 of the line spool 2 and, as has been mentioned previously, accommodates in its bore 16 an end portion of the shaft 4, has an inner end surface 33 which, when the lid 10 is mounted in place, is located adjacent a ring 34 disposed on the shaft 4 or on the spool 2, against which ring the outer bearing ring of the bearing 3 rests. By making use of an apparatus (which is not shown) to exercise axially directed force on the line spool 2 by the intermediary of the bearing (not shown) of the line spool at the other end of the line spool, the line spool may be shifted in a direction to the left with respect to FIG. 1 for exercising a force on the end surface 33 of the pin 15, whereby a certain mechanical braking force against rotation of the line spool can be preset, possibly in combination with a prior art bearing brake as a result of shear on the bearing balls from the inner and outer bearing rings.

It will be apparent from the above description that a device according to the invention possesses several important advantages, such as (a) brake weights 6 of the desired mass, (b) no risk that the brake weights be lost, (c) centrifugal braking effect which is easily and exactly adjustable, (d) simple and practical adjustment apparatus 20–23, and (e) ease of access in that all parts apart from the brake weights 6 proper are mounted in an easily mountable and dismountable part 10 which, in the assembled position, forms a central capsule-like insert in the one end wall 5 of the fishing reel and can form, together with the pin 15, a guide for the shaft 4 of the line spool and part of a presettable spool brake which acts independently of centrifugal forces. The centrifugal brake according to the invention may, however, be modified as far as details are concerned without departing from the spirit and scope of the present invention. For example, the pivotal brake weights could be of other form, for example be in the form of one-armed instead of double-armed levers for braking against a brake surface with their outer ends, in which event the brake surface could be in the form of an annular disc connected to the lid wall 12 and extending radially inwardly between the illustrated arm portions 6" and the end wall 9 of the spool 2. In order to make room for such a disc, the brake weights 6 could, for example, be mounted pivotally on axially longer bosses than the bosses 8 shown on the drawings, and the axial adjustment could be arranged, for example, in that the lid 10 or wall 12 be rendered axially adjustable, for example, by thread engagement on the frame end wall. These modifications should probably be readily apparent from the above discussion and are made possible in that the brake weights are pivotal in radial planes which extend parallel to the shaft of the line spool and preferably along this shaft as in the illustrated, preferred embodiment.

What we claim and desire to secure by Letters Patent is:

1. A fishing reel comprising a frame, a line spool (2) having opposite end walls and rotatably supported by said frame, and end wall means (5) supported by said frame and defining with one of said line spool end walls (9) a space therebetween, a centrifugally operated line spool braking device mounted for movement in said space to be centrifugally actuated by rotational movement of said line spool during casting for exerting a braking force thereon, said braking device comprising an annular braking surface (18) supported in said space by said end wall means (5) of said frame and facing said one line spool end wall (9), at least one braking lever (6) housed in said space and pivotally mounted on said line spool (2) outwardly of said one line spool end wall (9), said braking lever (6) having a pivot axis (7) which is spaced from and extends perpendicular to the rotational axis (4) of the line spool (2), and said lever (6) forming a double-armed pivotable braking lever having radially outer and inner arms (6", 6'), said radially outer arm (6") forming a centrifugal weight which, in an inactive position of said braking lever, projects outwardly from said radially inner arm (6') in a direction which forms an angle in relation to the rotational axis of the line spool as well as in relation to a radius extending from said rotational axis of the line spool through said pivot axis of the lever, said lever having a radially inner end portion, which portion which forms a braking member (19) of said braking lever, said annular braking surface (18) being supported by said end wall means (5) of said frame in a suitable position to be contacted by said braking member (19) when centrifugal forces acting on said radially outer arm (6") tend to pivot said radially outer arm in a direction decreasing said angle between said radially outer arm and said radius from said rotational axis of the line spool through said pivot axis (7) of said lever, whereby said braking lever will exert a braking force on said annular braking surface in dependence on the rotational speed of said line spool, an adjusting mechanism for adjusting the axial position of said annular braking surface (18), said adjusting mechanism comprising a threaded first supporting member (15) connected to said end wall means (5) of said frame, said first supporting member having a threaded portion which is coaxial with said rotational axis of said line spool and also coaxial with said annular braking surface (18), and a second supporting member (17) which supports said annular braking surface (18) and has an inner thread, said second supporting member being mounted on said first supporting member in threading engagement therewith for axially adjusting the position of said braking surface by rotating said second supporting member (17) on said first supporting member (15), said adjusting mechanism comprising an operating member (20) rotatably supported by said end wall means (5) of said base in a position to be manually actuable from the outer side of said end wall means, a first gear (22) rotatably mounted to be actuated by means of said operating member (20), and a second gear (23) fixed to said second supporting member (17) to be operated by said first gear (22) for said adjustment of the axial position of said braking surface (18) by rotating said second supporting member (17), said end wall means (5) of said base comprising a peripheral wall member having a central opening and a lid (10) having means to detachably connect said lid to said wall member in a position to close said opening, said adjusting mechanism including said operating member (20), said first and second gears (22, 23) and said first and second supporting members (15, 17) being supported by said lid and assembled to form a dismountable unit therewith.

2. The fishing reel as claimed in claim 1, wherein said lid (10) with said means detachably connecting it to said wall member (5) of said frame comprises a cup-shaped capsule having a cylindrical wall member (31), the axial inner end portion (31') of which is formed to be insertable in said opening of said peripheral end wall member, said peripheral end wall member and said capsule comprising cooperating means (24, 25) for easy detachable locking of said cylindrical wall member of said capsule in said opening of said peripheral end wall member.

3. The fishing reel as claimed in claim 2, wherein said first supporting member (15) has a central cylindrical cavity (16) which is coaxial with said rotational axis of the line spool, a shaft supporting said line spool being mounted in said frame and having an end portion which is slidingly received in said cylindrical cavity, when said capsule is detachably mounted in place.

* * * * *